Oct. 31, 1961   F. M. CALANDRA   3,006,042
AUTO AIR FRESHENER
Filed May 27, 1959
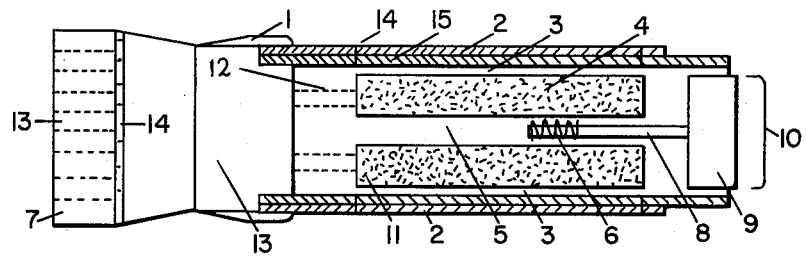
FIG. I
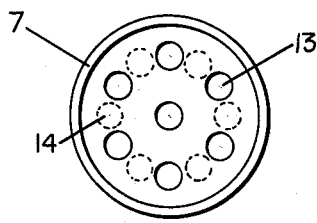
FIG. II
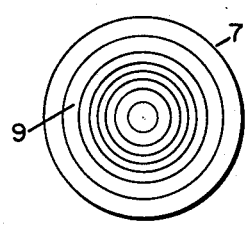
FIG. III
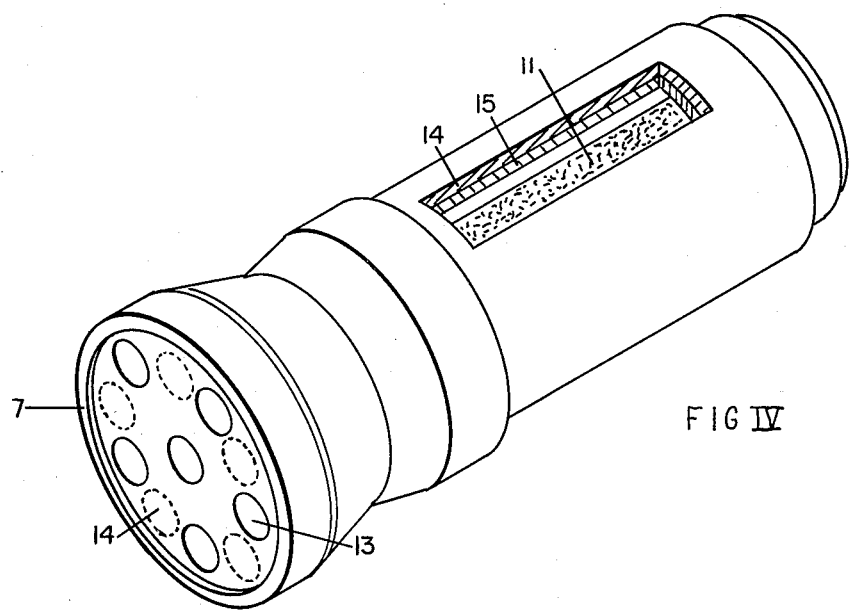
FIG. IV

United States Patent Office 3,006,042
Patented Oct. 31, 1961

3,006,042
AUTO AIR FRESHENER
Fred M. Calandra, 390 Ontario St., Buffalo 7, N.Y.
Filed May 27, 1959, Ser. No. 816,317
6 Claims. (Cl. 21—119)

This invention relates to a convenient air freshener for use in an automobile or similar vehicle. More particularly, the concept of this invention resides in an air freshener which may be utilized in the conventional auto lighter opening.

It is desirable on many occasions to quickly counteract or neutralize obnoxious odors usually encountered in an automobile or similar vehicle. The deodorizing devices now commercially available usually take the form of a suspension-type deodorizer which must be hung in the interior of the vehicle. Such deodorizers are not only unsightly and over-decorative, but are also unnecessary when the atmosphere in the vehicle contains fresh air. Further, on utilizing a suspension device of this type the aroma of the deodorizer is given off whether required or not. The device of this invention provides an air freshener which may be utilized only when desired, and only to the extent desired. In other words, in the event that the atmosphere is free of any obnoxious odors the device of this invention need not be operated. The selectivity of a device of this type provides a controllable means for regulating the auto atmosphere to any desired extent.

The novel features of this invention reside in the specific construction of the cylinder type deodorizer which is adaptable to be inserted in the conventional auto lighter opening. The device comprises an outer casing which takes the form of an ordinary auto lighter. In the inner portion of this deodorizer is an incense chamber which is adapted to receive any desired amount of incense. The heat contact end portion of this device takes the form of a conventional heat coil which is energized upon contact with the lighter opening heating means. On the opposite end portion of the deodorizer is a dial arrangement having two apertured plates. One of the plates remains stationary, while the outer plate is movable from the outer exterior of the device. Upon rotation of this outer plate, the apertures in the two plates are aligned one over the other allowing the incense fumes to escape to the atmosphere. All that is required in utilizing the device of this invention is that the auto lighter be removed and the device of this invention inserted in its place. Upon applying pressure to the deodorizer of this invention, the incense is ignited in such a manner that a rapid deodorizing effect is provided.

In order that the invention may be more clearly illustrated, it will be described in reference to the attached drawing.

FIGURE 1 is a sectional view of the device of this invention showing the interior arrangement.

FIGURE 2 is a plan view of the incense fume escaping means.

FIGURE 3 is a reverse plan view of the heat contacting portion of the device.

FIGURE 4 is a perspective view of the device of this invention showing the incense insert means or incense chamber opening.

Referring first to FIGURE 1, the device of this invention consists of an outer frame handle member 1 which has an open tube extension 2 adapted to receive cylinder core insert 3. The diameter of outer frame member 1 is such that it is utilizable in any conventional auto lighter opening. The material of the completed device may be of any heat resistant substance. Core insert 3 has a centrally positioned chamber 4 which is adapted to receive and hold an incense insert. Bisecting chamber 4 and extending through substantially its length is a central tube 5 which houses and supports springing means 6. Upon applying pressure to the front dial portion 7 of the device, the springing means 6 is compressed allowing coil support 8 to move in a direction horizontally along the axis of chamber 4 toward front dial portion 7. Heat coil 9 will contact the source of electrical energy 10 and in turn will ignite incense insert 11. The release incense fumes will then escape from the chamber 4 through apertures 12 into the collection chamber 13. Upon rotating front dial portion 7 in such a manner that apertures 13 are aligned directly over collection chamber apertures 14, the incense fumes are disseminated to the atmosphere. When it is desired to quickly decrease or halt the flow of incense fumes, the dial portion 7 is rotated to a position where the apertures are not aligned. It is, of course, just as convenient and expedient to remove core insert 3 from the frame handle member 1 and discard the incense.

FIGURE 2 illustrates a front view of the fume escaping means or dial portion 7. Here the device of this invention is shown in a closed position so that the incense fumes are locked in collection chamber 13. The collection apertures 14 are in a position of non-alignment with apertures 13.

FIGURE 3 illustrates a plan view of heat coil 9. Note that the diameter of heat coil 9 is substantially smaller than the diameter of front dial portion 7.

Upon complete combustion of the incense, the residue ashes may be removed by simply removing core insert 3 and inverting it to allow the ashes or unused incense to fall out.

Alternately the unused incense may be removed by rotating apertures 15 and 16 as shown in FIGURE 4 to a position of alignment. When apertures 15 and 16 are aligned one over the other, an opening or removal means is formed in collection chamber 13.

FIGURE 4 shows an alternate construction for removing and insertion of incense cartridge. Rather than having arrangement as described and illustrated in FIGURE 1, the alternate construction of FIGURE 4 may be used.

It is obvious that various modifications and ramifications may be made in the device of this invention without departing from the spirit of this invention. Anyone skilled in the art upon reading the basic invention of this disclosure will conceive of various deviations of the herein disclosed device. These are intended to be included within the scope of this invention.

I claim:
1. A deodorizer which comprises in combination an outer frame handle member and a cylindrical core insert, said core insert member telescopically positioned in said outer frame handle member and having at its extreme end heating portion an incense ignition means and having a central tube extending through substantially the length of said incense chamber, said ignition means consisting essentially of a heating coil and a coil support means said heating coil adapted to simultaneously contact a source of energy and an incense insert upon the exertion of pressure thereto, said coil support means extending into and adjustably supported by said central tube.

2. A deodorizer which comprises in combination an outer frame handle member and a cylindrical core insert, said frame handle member having a tube open at one end and adaptable to receive said cylindrical core insert and having at the opposite end incense fume escape means, said core insert member having at its extreme end heating portion an incense ignition means and having a central tube extending through substantially the length of said incense chamber, said ignition means consisting essentially of a heating coil and a coil support means, said coil support means extending into and adjustably supported by said central tube.

3. A deodorizer adapted to be utilized in a motor vehicle lighter opening which comprises in combination an outer frame handle member and a cylindrical core insert, said frame handle member having a venting means at its first end portion and a tube open at one end and adaptable to receive said cylindrical core insert, said core insert member having at its extreme end heating portion an incense ignition means and having a central tube extending through substantially the length of said incense chamber, said ignition means consisting essentially of a heating coil and a coil support means, said coil support means extending into and adjustably supported by said central tube.

4. A deodorizer adapted to be utilized in a motor vehicle lighter opening which comprises in combination an outer frame handle member and a cylindrical core insert, said frame handle member having a venting means at its first end portion and a tube open at the opposite end, said tube opening adaptable to receive said cylindrical core insert, said core insert member having at its extreme end heating portion an incense ignition means and having a central tube extending through substantially the length of said incense chamber, said ignition means consisting essentially of a heating coil and a coil support means, said coil support means having on one end an attached spring means and on its opposite end said heating coil, said coil support means extending into and adjustably supported by said central tube.

5. A deodorizer adapted to be utilized in a motor vehicle lighter opening which comprises in combination, an outer frame handle member, and a cylindrical core insert, said core insert member having at one end an incense ignition means and at the opposite end, means adapted to telescopically fit into said frame handle member, said incense ignition means consisting of a wire coil, and having an outer face adapted to contact a source of energy, and an inner face which is adapted to contact and ignite an incense insert upon the exertion of pressure thereto.

6. A deodorizer adapted to be utilized in a motor vehicle which comprises in combination, an outer frame handle member, and a cylindrical core insert, said frame handle member having a venting means at its first end portion and an open tube at the opposite end portion, said tube opening adaptable to receive said cylindrical core insert member, said core insert member having a side aperture adapted to receive and dispose an incense insert, said core insert member having at its extreme end heating portion, an incense ignition means, said ignition means consisting essentially of a heating coil having an inner face and an outer face, said coil adapted to simultaneously contact said incense insert, and said source of energy upon the exertion of pressure thereto.

References Cited in the file of this patent
UNITED STATES PATENTS

| | | |
|---|---|---|
| 1,850,076 | Hacker | Mar. 22, 1932 |
| 2,733,333 | Peters | Jan. 31, 1956 |
| 2,898,649 | Murray | Aug. 11, 1959 |